US011651341B2

(12) United States Patent
Pappano

(10) Patent No.: US 11,651,341 B2
(45) Date of Patent: May 16, 2023

(54) MULTI-PLATFORM ELECTRONIC PAYMENT TRANSACTION RISK PROFILING

(71) Applicant: Vantiv, LLC, Cincinnati, OH (US)

(72) Inventor: Joseph A. Pappano, Cincinnati, OH (US)

(73) Assignee: Worldpay, LLC, Symmes Township, OH (US)

( * ) Notice: Subject to any disclaimer, the term of this patent is extended or adjusted under 35 U.S.C. 154(b) by 112 days.

(21) Appl. No.: 14/990,988

(22) Filed: Jan. 8, 2016

(65) Prior Publication Data

US 2017/0200142 A1     Jul. 13, 2017

(51) Int. Cl.
  *G06Q 20/20*  (2012.01)
  *G06Q 20/40*  (2012.01)
  *G06Q 50/34*  (2012.01)
  *G06Q 20/02*  (2012.01)

(52) U.S. Cl.
  CPC ........... *G06Q 20/202* (2013.01); *G06Q 20/02* (2013.01); *G06Q 20/40* (2013.01); *G06Q 20/4016* (2013.01); *G06Q 50/34* (2013.01)

(58) Field of Classification Search
  CPC .... G06Q 20/4016; G06Q 20/20; G06Q 20/26; G06Q 20/40; G06Q 20/401; G06Q 40/025; G06Q 20/40145; G06Q 20/382; G06Q 20/405; G06Q 40/00; G06Q 20/12; G06Q 20/38; G07F 17/32; G07F 17/3288; H04L 63/0861; H04L 63/08; H04W 12/06
  See application file for complete search history.

(56) References Cited

U.S. PATENT DOCUMENTS

| 6,999,943 B1 * | 2/2006 | Johnson | G06Q 20/10 705/35 |
| 8,706,641 B2 * | 4/2014 | Bruesewitz | G06Q 20/04 705/38 |
| 8,843,411 B2 * | 9/2014 | Lawrence | G06Q 30/02 705/35 |

(Continued)

FOREIGN PATENT DOCUMENTS

| WO | WO-2013082190 A1 * | 6/2013 | ......... G06Q 20/4016 |
| WO | WO 2015191609 A1 * | 12/2015 | ............. G06Q 10/00 |

*Primary Examiner* — Florian M Zeender
*Assistant Examiner* — Milena Racic
(74) *Attorney, Agent, or Firm* — Bookoff McAndrews, PLLC

(57) ABSTRACT

Technologies for enhancing payment transactions include a payment gateway computing system. The payment gateway computing system receives authorization request messages from point of sale systems of one or more betting-related merchants. The transactional information for each of the plurality of authorization requests is cataloged into a repository as historical payment data. A risk profile based on the historical payment data associated with a cardholder is generated. The risk profile can be correlated to transactional velocity or other parameter. The risk profile is transmitted to one of a plurality of payment vehicle issuers that can utilize the risk profile for authorization decisioning. Therefore, the payment vehicle issuer can make authorization decisioning with expanding insight into the cardholder's gaming-related purchase activity.

22 Claims, 4 Drawing Sheets

(56) References Cited

U.S. PATENT DOCUMENTS

| | | | | |
|---|---|---|---|---|
| 8,857,710 | B1* | 10/2014 | Kowalchyk | G06Q 40/04 |
| | | | | 235/380 |
| 9,805,370 | B1* | 10/2017 | Quigley | G06Q 20/4014 |
| 10,002,348 | B1* | 6/2018 | Doctor | G06Q 20/401 |
| 10,210,317 | B2* | 2/2019 | Anderson | G06F 21/31 |
| 10,282,709 | B2* | 5/2019 | Basu | G06Q 20/02 |
| 10,755,281 | B1* | 8/2020 | Yip | G06Q 20/4016 |
| 11,514,513 | B2* | 11/2022 | Word | G06Q 20/10 |
| 2008/0301040 | A1* | 12/2008 | Knudson | G06Q 20/10 |
| | | | | 705/39 |
| 2011/0016041 | A1* | 1/2011 | Scragg | G06Q 40/00 |
| | | | | 705/38 |
| 2013/0030993 | A1* | 1/2013 | Peace | G06Q 20/4016 |
| | | | | 705/39 |
| 2014/0304158 | A1* | 10/2014 | Basu | G06Q 20/4016 |
| | | | | 705/44 |
| 2015/0012430 | A1* | 1/2015 | Chisholm | G06Q 20/4016 |
| | | | | 705/44 |
| 2015/0039513 | A1* | 2/2015 | Adjaoute | G06Q 20/4016 |
| | | | | 705/44 |
| 2015/0095225 | A1* | 4/2015 | Appana | G06Q 20/3674 |
| | | | | 705/41 |
| 2016/0034900 | A1* | 2/2016 | Nelsen | G06Q 20/4016 |
| | | | | 705/44 |
| 2016/0078436 | A1* | 3/2016 | Tomasofsky | G06Q 20/40 |
| | | | | 705/44 |
| 2016/0210608 | A1* | 7/2016 | Reany | G06Q 20/227 |
| 2016/0260169 | A1* | 9/2016 | Arnold | G06Q 40/12 |
| 2019/0279216 | A1* | 9/2019 | Smith | G06Q 20/4016 |

* cited by examiner

MULTI-PLATFORM ELECTRONIC PAYMENT TRANSACTION RISK PROFILING

BACKGROUND

Consumers typically have access to a number of payment vehicles. Each payment vehicle can be issued by a financial institution. As the consumer utilizes a number of different payment vehicles at a number of different merchants, the financial institution may not have visibility into that consumer's spending behaviors. Having access to such visibility may be useful for, among other things, authorization decisioning for certain types of payment vehicle transactions.

SUMMARY

In an embodiment, the present disclosure is directed, in part, to a method for cardholder risk profile generation based on monitored electronic payment transaction activity processed over electronic payment networks. The method includes receiving, by a payment gateway computing system, a plurality of authorization request messages from point of sale systems of one or more merchants, wherein each of the plurality of authorization request messages comprises transactional information, wherein the transactional information comprises a cardholder identifier and a merchant identifier. The method further includes cataloging, by the payment gateway computing system, the transactional information for each of the plurality of authorization requests into a repository to define historical payment data. The method also includes, for each of the plurality of authorization request messages, electronically communicating with one or a plurality of payment processors to receive authorization instructions for transmission to the requesting merchant. The method further includes receiving, by the payment gateway computing system, an authorization request message from a point of sale system of a betting-related merchant, wherein the authorization request message comprises information to identify the cardholder and a payment vehicle. Additionally, the method includes, generating a risk profile based on the historical payment data associated with the cardholder based on the cardholder identified by the authorization request and transmitting, by the payment gateway computing system, the risk profile to one of the plurality of payment processors.

In another embodiment, the present disclosure is directed, in part, to a payment gateway computing system in communication with a plurality of merchant point of sale systems and one or more payment processors. The payment gateway computing system comprises one or more processors non-transitory computer readable medium having instructions stored thereon which when executed by a processor cause the processor to receive a plurality of authorization request messages from point of sale systems of one or more merchants, wherein each of the plurality of authorization request messages comprises transactional information, wherein the transactional information comprises a cardholder identifier and a merchant identifier. The instructions also cause the processor to catalog the transactional information for each of the plurality of authorization requests into a repository to define historical payment data. The instructions also cause the processor to electronically communicate with one or a plurality of payment processors to receive authorization instructions for transmission to the requesting merchant for each of the plurality of authorization request messages. The instructions further cause the processor to receive an authorization request message from a point of sale system of a betting-related merchant, wherein the authorization request message comprises information to identify the cardholder and a payment vehicle. Based on the cardholder identified by the authorization request, a risk profile is generated based on the historical payment data associated with the cardholder. The instructions further cause the processor to transmit the risk profile to one of the plurality of payment processors.

In another embodiment, the present disclosure is directed, in part, to a method of cardholder risk profile generation. The method including, receiving, by a payment gateway computing system, a plurality of authorization request messages for betting-related goods or services based on payment transactions initiated by a consumer, wherein the plurality of authorization request messages originate from two or more different merchants. The method further includes, for each of the plurality of authorization request messages, electronically communicating, by the payment gateway computing system with a payment processor, via a payment transaction messaging in a predefined message format to receive authorization instructions, wherein the payment transaction messaging comprises a risk profile for the consumer based on the received plurality of authorization messages, and wherein the risk profile is contained within a discretionary field of the predefined message format.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
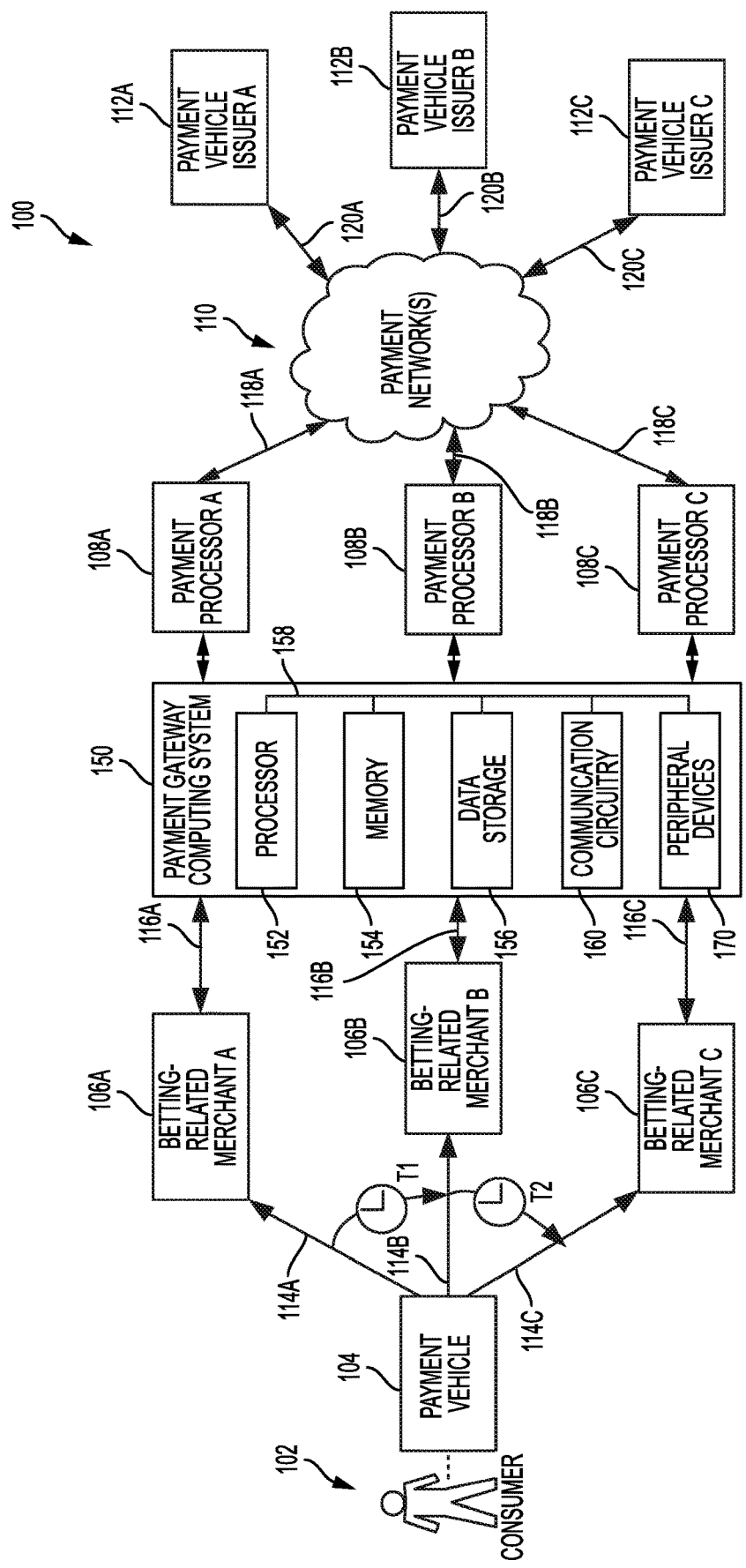
FIG. 1 depicts a consumer interacting with a plurality of betting-related merchants in an example payment ecosystem.

Various non-limiting embodiments of the present disclosure will now be described to provide an overall understanding of the principles of the structure, function, and use of the systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. The payment vehicles described herein communicate account information (e.g., an account number or other account indicative information) during a purchase event and/or payment transaction.

Consumers can have access to many different payment vehicles that may be issued by different entities, referred to herein generally as payment vehicle issuers. For example, a consumer may routinely use one or more credit cards, debit cards, mobile accounts, and/or other types of payment vehicles. A consumer can utilize a first payment vehicle issued by a first payment vehicle issuer to initiate a purchase transaction at a first merchant and a second payment vehicle issued by a first payment vehicle issuer to initiate a purchase transaction at a second merchant. Due to the communication paradigms utilized by digital payment ecosystems, as described below regard to FIG. 1, the second payment vehicle issuer does not necessarily have visibility into the transaction that transpired at the first merchant. This limitation can be problematic if it is desirable for second payment vehicle issuer to base its authorization decision, at least in part, on previous transactions initiated by the consumer using one or more other payment vehicles. For example, if the second payment vehicle issuer is requested to authorize a transaction for gambling or betting, having insight into previous transactions initiated by the consumer in the gambling or betting space would be helpful to the second payment vehicle issuer in making the authorization decision. Knowledge related to the previous transactions of the consumer could be used to determine transactional velocity, or otherwise used to assess risks associated with authorizing a consumer's transaction.

FIG. 1 depicts a consumer 102 interacting with a plurality of merchants 106A-C in an example payment ecosystem 100. As depicted in FIG. 1, the consumer can utilize a payment vehicle 104 to initiate a first transaction 114A at a merchant A 106A. A point-of-sale system (not shown) of merchant A 106A can communicate an authorization request to a payment gateway computing system 150 which can, in turn, communicate with the payment processor A 108A. The authorization request can include various information, such as MCC, requested amount of funds to be authorized, payment vehicle information, cardholder identification information, and so forth. The payment processor A 108A can route the request, based on the payment vehicle 104, through the appropriate payment network 110 to a payment vehicle issuer, such as payment vehicle issuer A 112A. Example payment networks 110 include the VISA, MASTERCARD, and AMERICAN EXPRESS payment network. The payment vehicle issuer A 112A receives the request and determines whether to authorize the funds. A response to the authorization request is then provided through return communications to the merchant A 106A. Based on the response, the transaction initiated by the consumer 102 is either approved or denied.

At a later point in time, as depicted by T1, the consumer 102 can initiate a second transaction 114B at a merchant B 106B. The merchant B 106B can communicate with a payment processor B 108B via the payment gateway computing system 150. In turn, the payment processor B 108B can route the request through the appropriate payment network 110 to a payment vehicle issuer. If the payment card used by the consumer 102 to initiate the second transaction is the same as the payment card to initiate the first transaction, the request will be routed to the payment vehicle issuer A 112A. Otherwise, the request can be routed to a different payment vehicle issuer, such as a payment vehicle issuer B 112B. The payment vehicle issuer B 112B responds to the authorization request through return communications to the merchant B 106B.

At a later point in time, as depicted by T2, the consumer 102 can initiate a third transaction 114C at a merchant C 106C. The merchant C 106C can communicate with a payment processor C 108C via the payment gateway computing system 150. In turn, the payment processor C 108C can route the request through the appropriate payment network 110 to a payment vehicle issuer. If the payment card used by the consumer 102 to initiate the third transaction is the same as the payment card to initiate the first transaction, the request will be routed to the payment vehicle issuer A 112A. If the payment card used by the consumer 102 to initiate the third transaction is the same as the payment card to initiate the second transaction, the request will be routed to the payment vehicle issuer B 112B. Otherwise, the request can be routed to a different payment vehicle issuer, such as a payment vehicle issuer C 112C. The payment vehicle issuer C 112C responds to the authorization request through return communications to the merchant C 106C. Based on the response, the third transaction 114C initiated by the consumer 102 is either approved or denied.

The payment gateway computing system 150 of FIG. 1 can be used to address issues that payment vehicle issuers may face in determining whether to process electronic payment transactions. Namely, the decision by the payment vehicle issuer B 112B and payment vehicle issuer C 112C to either approve or deny the transaction is conventionally based on limited, transaction-specific information that is provided in conventional authorization messaging. Such information is typically the MCC of the merchant, the amount of funds requested in the transaction, and the amount of funds available in the account associated with the payment vehicle 104. This amount of information, however, does not provide the payment vehicle issuer with visibility into the purchasing behavior of the consumer 102. For example, if T1 and T2 are relatively small amounts of time, and the consumer 102 is using many different payment vehicles 104, the consumer 102 could be quickly making purchases or other initiating other types of transactions across many platforms. In such cases, any single payment vehicle issuer may not have intelligence regarding the other transactions initiated by the consumer, especially if the consumer 102 is using a number of different payment vehicles 104 for the transactions. Having limited optics into the purchase behavior 102 can be especially problematic for certain industries, such as the gaming/betting industry. It would be desirable for entities within the payment ecosystem providing betting-related services to be able to make transaction authorization decisions based on a more complete view of the bettor's spending behavior.

In accordance with the present disclosure, the payment gateway computing system 150 can monitor, track, and analyze transactional behavior of the consumer 102 such that more informed authorization decisioning can be performed. Such behavioral monitoring can be performed by the payment gateway computing system 150 across a plurality of merchants, a plurality of payment vehicles for a plurality of transaction types, such as ATM withdraws, debit transactions, credit transactions, stored value transactions, and so forth. As described in more detail below, payment gateway computing system 150 can utilize the tracked data to generate a risk-profile to utilizing by a payment vehicle issuer, or other entity, for authorization decisioning.

The payment gateway computing system 150 can be embodied as a computing device or server capable of processing, communicating, storing, maintaining, and transferring data. For example, the payment gateway computing system 150 can be embodied as a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the payment gateway computing system 150 can be embodied as a computing device integrated with other systems or subsystems, such as those of a payment processor, a financial transaction processing gateway, and/or other entities that function to assist with the processing of financial transactions within a payment ecosystem. In the illustrative embodiment of FIG. 1, the payment gateway computing system 150 includes a processor 152, a system bus 158, a memory 1541, a data storage 156, communication circuitry 160, and one or more peripheral devices 170. The payment gateway computing system 150 can include other or additional components, such as those commonly found in a server and/or computer (e.g., various input/output devices). Additionally, in some embodiments, one or more of the illustrative components can be incorporated in, or otherwise from a portion of, another component. For example, the memory 1541, or portions thereof, can be incorporated in the processor 152 in some embodiments. Furthermore, it should be appreciated that the payment gateway computing system 150 can include other components, sub-components, and devices commonly found in a computer and/or computing device, which are not illustrated in FIG. 1 for clarity of the description.

The processor 152 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the payment gateway computing system 150 includes the system bus 158 for interconnecting the various components of the payment gateway computing system 150. The system bus 158 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 152, the memory 1541, and other components of the payment gateway computing system 150. In some embodiments, the payment gateway computing system 150 can be integrated into one or more chips such as a programmable logic device or an application specific integrated circuit (ASIC). In such embodiments, the system bus 158 can form a portion of a system-on-a-chip (SoC) and be incorporated, along with the processor 152, the memory 1541, and other components of the payment gateway computing system 150, on a single integrated circuit chip.

The memory 1541 can be embodied as any type of volatile or non-volatile memory or data storage capable of performing the functions described herein. For example, the memory 1541 can be embodied as read only memory (ROM), random access memory (RAM), cache memory associated with the processor 152, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 1541 can store various data and software used during operation of the payment gateway computing system 150 such as operating systems, applications, programs, libraries, and drivers.

The data storage 156 can be embodied as any type of device or devices configured for short-term or long-term storage of data such as, for example, memory devices and circuits, memory cards, hard disk drives, solid-state drives, or other data storage devices. For example, in some embodiments, the data storage 156 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 152, or the memory 1541 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 160 of the payment gateway computing system 150 can be embodied as any type of communication circuit, device, interface, or collection thereof, capable of enabling communications between the payment gateway computing system 150 and computing devices communicatively coupled thereto. For example, the communication circuitry 160 can be embodied as one or more network interface controllers (NICs), in some embodiments. The communication circuitry 160 can be configured to use any one or more communication technologies (e.g., wireless or wired communications) and associated protocols (e.g., Ethernet, Wi-Fi®, WiMAX, etc.) to effect such communication. The payment gateway computing system 150 can communicate over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication with other computing devices.

Additionally, in some embodiments, the payment gateway computing system 150 can further include one or more peripheral devices 170. Such peripheral devices 170 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

Figure 2:
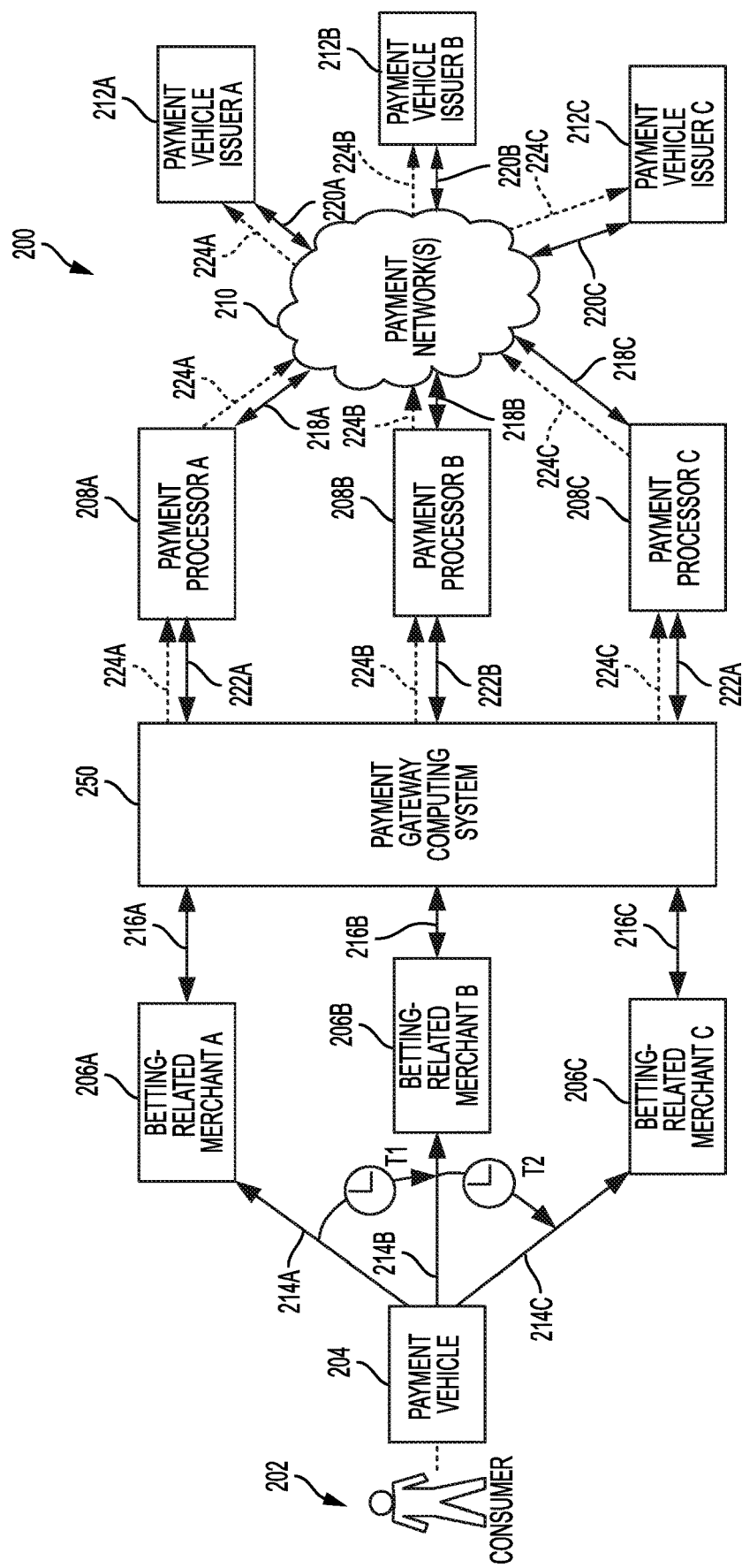
FIG. 2 depicts a payment gateway computing system generating and providing risk profiles for transactions initiated by a consumer at betting-related merchants in an example payment ecosystem.

FIG. 2 depicts a payment ecosystem 200 that includes a payment gateway computing system 250 that generates and provides risk profiles for transactions initiated by a consumer 202 at betting-related merchants 206A-C in the example payment ecosystem 200. The payment ecosystem 200 includes a payment gateway computing system 250 that can assist with addressing the problems and deficiencies associated with processing payments over electronic payment networks. For example, the payment gateway computing system 250 can provide a "single view" for the consumer 202 across a plurality of transactions, at a plurality of different merchants, and using a plurality of different payment vehicles. As shown in FIG. 2, each of a plurality of betting-related merchants 206A-C can communicate with the payment gateway computing system 250.

While betting-related merchants 206A-C are depicted for the purposes of illustration, the systems and methods described herein can be used in association with a variety of different implementations in which merchants, issuer processors, or other stakeholders desire to make authorization decisioning using additional data and/or analytics. The betting-related merchants depicted in FIG. 2 can include, without limitation, merchants that offer gaming, betting, or casino-based goods/services. For example, such merchants can sell lottery tickets or sell chips for use at virtual or brick-and-mortar casinos. Other example betting-related merchants include those offering off-track betting (OTB) and wagers at race tracks. Yet other examples of betting-related merchants can include online wagering website, online poker rooms, or mobile applications providing gaming/betting services. In some embodiments, betting-related merchants can be identified by its merchant category code (MCC). By way of example, the MCC of a transaction originating at a betting-related merchant can be MCC 7995 (indicating betting/casino gambling), MCC 7800 (indicating government-run online lotteries), MCC 7801 (indicating regulated online casinos), or MCC 7802 (indicating regulated events for online horse and dog racing).

When the consumer 202 initiates a transaction (shown as transactions 214A-C) at any of the betting related-merchants 206A-C, the point-of-sale (POS) system (not shown) is configured to transmit the request to the payment gateway computing system 250. In one example embodiment, the payment gateway computing system 250 is provided by the EXPRESS payments gateway offered by Element Payment Services, Inc., Chandler, Ariz.

The payment gateway computing system 250 can accept payment transaction messaging from a variety of merchants, including betting-related merchants, and route the payment transaction messaging to appropriate payment processors, such as one of payment processors 208A-C. Beneficially, the payment gateway computing system 250 can also augment the messaging sent to the payment processors 208A-C to include information that can ultimately be used by one of the payment vehicle issuers 212A-C for authorization decisioning. The payment authorization messaging sent from the payment gateway computing system 250 to the payment processors 208A-C is schematically depicted in FIG. 2 as messaging 222A-C. Included along with that messaging 222A-C is a risk profile 224A-C. The risk profile 224A-C can be provided in any number of suitable formats. In one embodiment, the risk profile is a score, grade, or other type of ranking, as determined by the payment gateway computing system 250. The particular risk profile generated can be based on, for example, parameters of a payment vehicle issuer associated with the transaction. The risk profile 224A-C can be dispatched by the payment gateway computing system 250 using a discretionary field in the payment messaging protocol that is utilized by the payment ecosystem 200, as described in more detail below in FIG. 4.

As depicted in FIG. 2, the risk profiles 224A-C generated and transmitted by the payment gateway computing system 250 can accompany the payment transaction messaging through the payment network 210 until they are received by the respective payment vehicle issuer 212A-C. The payment vehicle issuer receiving the risk profile can utilize the additional information to aid in its authorization decisioning. While FIG. 2 depicts the passage of time as an example factor in preparing the risk profiles 224A-C, any number and type of factors can be utilized. Example factors can include, without limitation, number of transactions initiated by a consumer, number of payment vehicles used by a consumer, payment vehicle type, value amount of each transaction, time of day of transaction, geographic location of the transactions, and so forth.

The risk profiles 224A-C generated by the payment gateway computing system 250 can be based on the consumer's 202 purchasing behavior across a plurality of betting-related merchants 206A-C. For example, should a consumer use the same payment vehicle to initiate large transactions at betting-related merchant A and betting-related merchant B within a certain period of time, or otherwise above a transaction velocity threshold, the risk profile 224B generated by the payment gateway computing system 250 that accompanies the messaging 222B can assist the payment vehicle issuer 212B in determining whether to authorize the request. As used herein, transaction velocity generally relates to a number of transactions initiated by a consumer over a certain period of time using one or more payment vehicles. If the second transaction 214B is approved, and then the consumer 202 initiates a large transaction at betting-related merchant C within a certain period of time, or otherwise above a transaction velocity threshold, the risk profile 224C generated by the payment gateway computing system 250 can indicate a higher level of risk than the risk profile 224B that was previously generated, based on the transaction velocity and/or other factors.

While transaction amount and temporal-based parameters of the transactional activity of the consumer 202 can be catalogued by the payment gateway computing system 250 and used to determine the risk profile, a wide variety of other factors inputs can be utilized to generate the risk profile. For example, historical information associated with dispute and chargebacks of the consumer 202 can be utilized to by the payment gateway computing system 250 to generate the risk profile for a consumer. Further, the risk profile format or determination approach can be based on the preference of the payment vehicle issuer that will be using the risk profile for authorization decisioning. Therefore, the payment gateway computing system 250 may utilize a first risk profile generation technique for payment vehicles within a first bank identification number (BIN) range and a second risk profile generation technique for payment vehicles within a second bank identification number (BIN) range.

Figure 3:
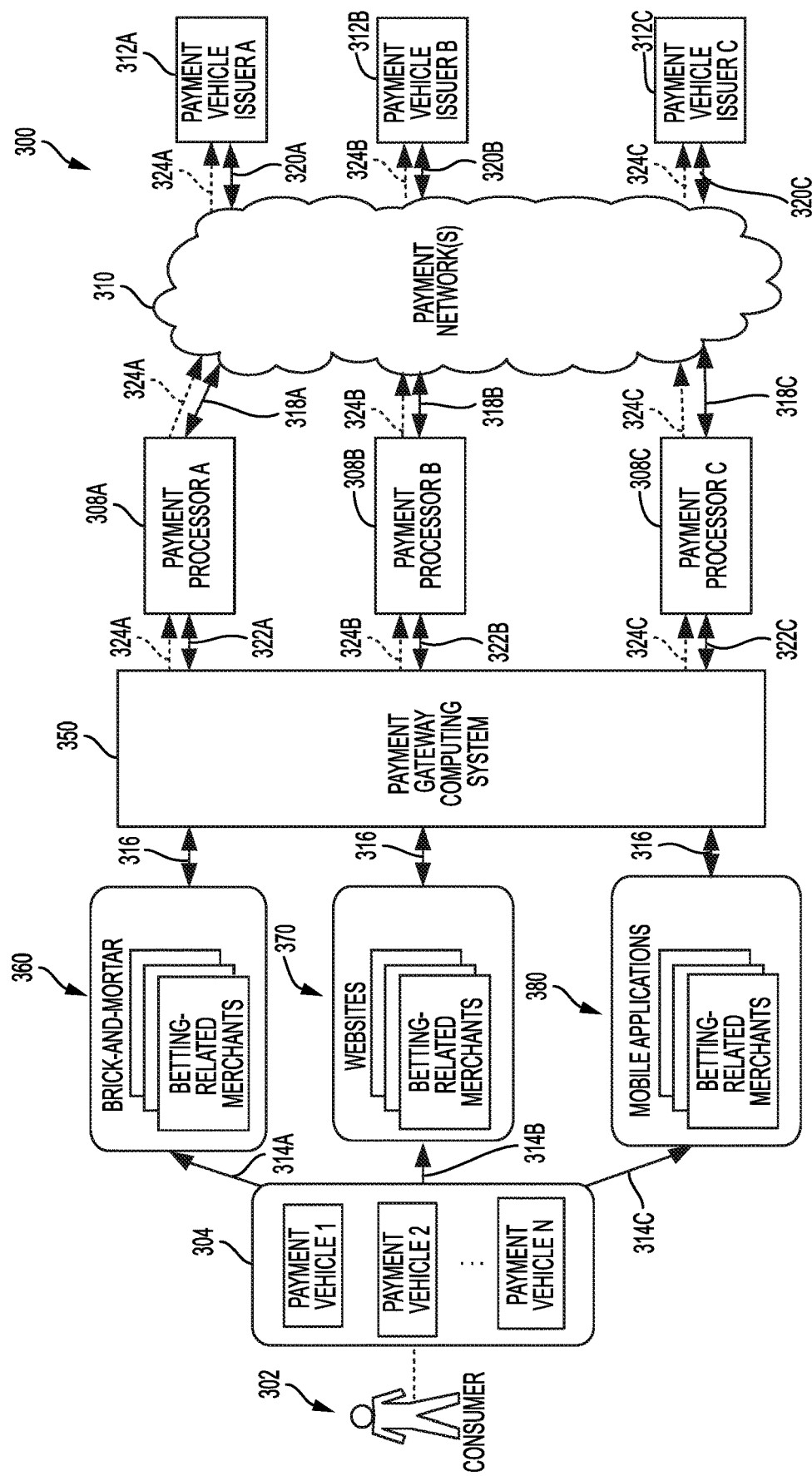
FIG. 3 depicts a payment gateway computing system generating and providing risk profiles for transactions initiated by a consumer at a plurality of different types of betting-related merchants using a plurality of different payment vehicles in an example payment ecosystem.

While FIG. 2 schematically depicts three betting-related merchants 206A-C, payment ecosystems typically include large amount of merchants, which may offer goods and services (including gaming/gambling) to consumers across many different channels. Additionally, consumers typically use more than payment vehicle. These complexities of the payment ecosystems increase the challenges of payment vehicle issuers seeking to make informed authorization decisions. FIG. 3 depicts a payment ecosystem 300 that includes a payment gateway computing system 350 generating and providing risk profiles to transactions initiated by a consumer 302 at a plurality of different types of betting-related merchants using a plurality of different payment vehicles 304 in the example payment ecosystem 300. The payment ecosystem 300 schematically depicts the consumer 302 interacting with a variety of different merchant types (brick and mortar merchants 360, websites 370, and mobile applications 380). Further, FIG. 3 depicts the consumer 302 having access to numerous payment vehicles, depicted at payment vehicles 1, 2 . . . N.

Each of the betting-related merchants 360, 370, 380 is configured to direct its authorization requests to a payment gateway computing system 350. As such, the payment gateway computing system 350 has visibility into the consumer's 302 transaction activities across a number of merchant platforms and across a number of different payment vehicles. In some embodiments, the payment gateway computing system 350 catalogs a consumer's 302 activity by utilizing a database that is populated with transactional details. For example, for the consumer 302, the database can generally track purchasing events for each of the payment vehicles 304 at each of the betting-related merchants 360, 370, 380. In this regard, a purchase amount, a time stamp, a date stamp, and a merchant identifier can be maintained in the database. Additional information can also be stored, such as device IDs (i.e., device fingerprint, browser fingerprint, MAC address, etc.), geographical information, IP addresses, and so forth. Information associated with other activities of the consumer 302 can also be stored in the database, such as chargeback activity, dispute activity, and so forth. When the payment gateway computing system 350 determines a risk profile 324A-C, the database can be queried to assess the behavior of the consumer 302. The payment gateway computing system 350 can transmit the risk profile 324A-C, along with authorization messaging 322A-C to the appropriate payment processor 308A-C. Similar to the message flow described above in FIG. 2, the payment processor 308A-C can communicate through the payment networks 310 to relay the authorization messaging and accompanying risk profile to the appropriate payment vehicle issuer 312A-C. Based on the risk profile 324A-C, along with the conventional authorization request messaging 320A-C, the payment vehicle issuer 312A-C can make a more informed decision regarding payment authorization.

Figure 4:
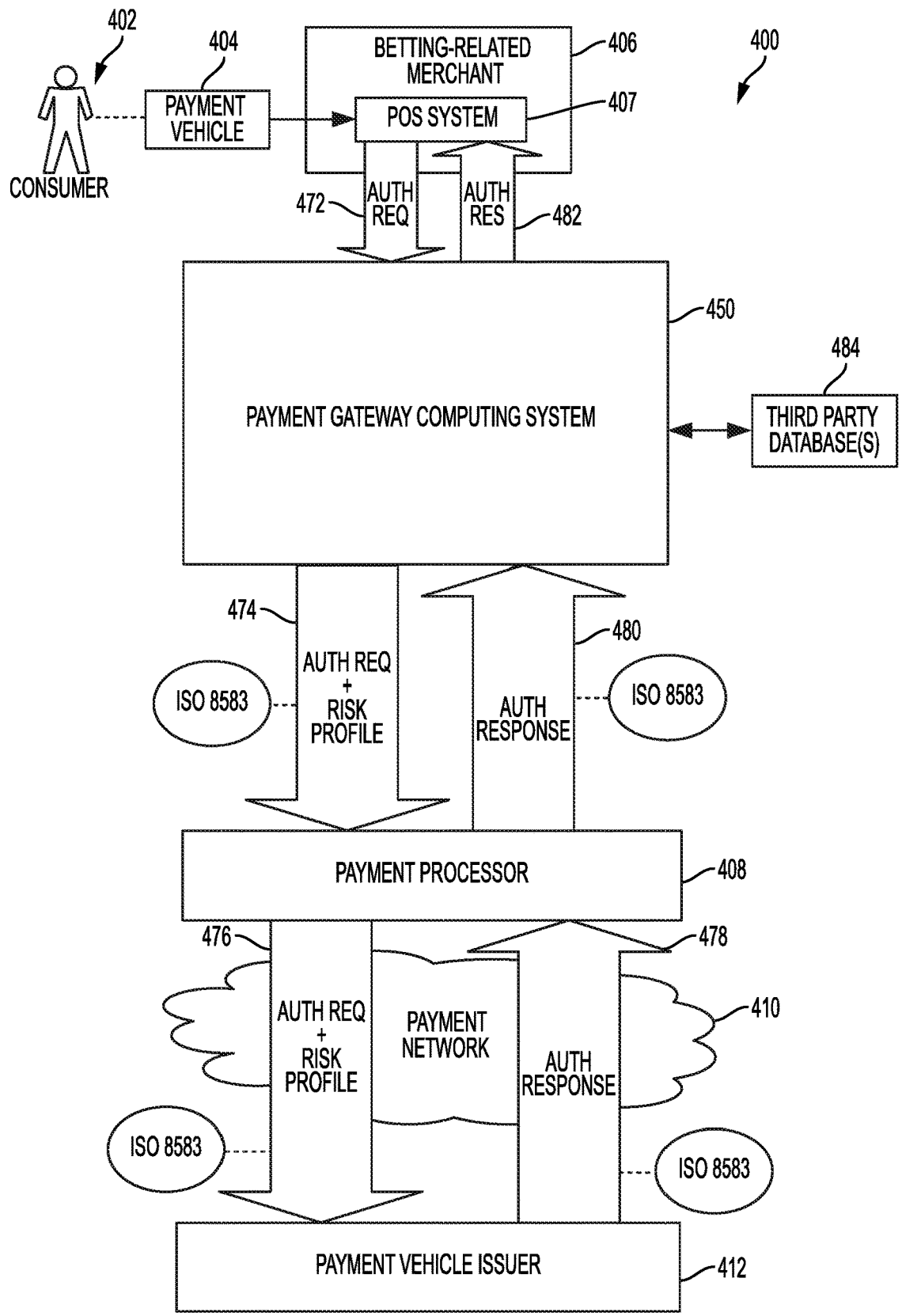
FIG. 4 depicts an electronic transaction payment flow utilizing a risk profile for authorization decisioning.

FIG. 4 depicts an electronic transaction payment flow 400 utilizing a risk profile of a consumer 402 for authorization decisioning by a payment vehicle issuer 412. The consumer 402 first initiates a transaction at a betting-related merchant 406 using a payment vehicle 404. Such initiation technique can be a swipe of the payment vehicle 404 at the POS system 407 or otherwise entering or conveying payment vehicle information into the POS system 407 of the betting-related merchant 406. The POS system 407 then forms an authorization message 472 for transmission to a payment gateway computing system 450.

Upon receiving authorization request 472, the payment gateway computing system 450 can determine that the merchant sending the request is betting-related merchant 406 (i.e., through the MCC included in the authorization request 472). The payment gateway computing system 450 can then determine whether a risk profile exists or can be generated for the consumer 402. Such determination can be based on, for example, whether a sufficient level of behavioral data for that consumer 402 is stored within data storage 456. When a sufficient level of behavior data is available, a risk profile can be generated by the payment gateway computing system 450. In some embodiments, the techniques for determining the risk profile are based on the payment vehicle 404. For example, certain payment vehicle issuers may desire to receive risk profiles in a first format while other payment vehicle issuers may desire to receive risk profiles in a second format. Moreover, some payment vehicle issuers may wish to weigh certain types of activities more heavily that other activities when determining the risk profile. The format of the risk profile can be suitable for transmission in a discretionary field of conventional authorization messaging. Also, such determination of the risk profile can occur in substantially real-time as the authorization request 472 is received by the payment gateway computing system 450 so that undesirable delays are not introduced into the payment authorization process.

While the risk profile can be based on information stored by the payment gateway computing system 450, additionally or alternatively it can also be based on information stored by, or retrieved from, third party sources (schematically shown as databases 484). Example of third party sources can include a database on problem gamers, as well as other data related to the consumer 502.

Once the risk profile is generated, the payment gateway computing system 450 can form the appropriate authorization messaging 474 for transmission to a payment processor 408. In the illustrated embodiment, the authorization messaging 474 is formed in the International Organization for Standardization (ISO) 8583 messaging format. The risk profile can carried in the ISO 8583 messaging in a discretionary field, or in another suitable carrier, such as a message header. The payment processor 408 can receive the communication from the payment gateway computing system 450 and form authorization messaging 476 for routing to the appropriate payment vehicle issuer 412 through a payment network 410. The payment vehicle issuer 412 can then utilize the risk profile contained within the authorization messaging 476, along with its decisioning parameters determine whether to authorize the transaction at the betting-related merchant 406. Beneficially, the risk profile can provide the payment vehicle issuer 412 with a single view of the consumer's 402 activities related to betting/gambling channels.

As illustrated in FIG. 4, an authorization response 478 of the payment vehicle issuer 412 can be returned to the payment processor 408, which can relay the response as authorization response 480 to the payment gateway computing system 450. The authorization responses 478, 480 are both shown to be in ISO 8583 format, although this disclosure is not so limited. The payment gateway computing system 450 ultimately relays the authorization decision to POS system 407 in an authorization response 482.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment," means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment," in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A computer-implemented method of cardholder risk profile generation based on monitored electronic payment transaction activity processed over electronic payment networks, comprising:

receiving, by a payment gateway computing system over a computer network, a plurality of authorization request messages from one or more point-of-sale systems of one or more merchants, wherein each of the plurality of authorization request messages comprises transactional information including a cardholder identifier, a payment vehicle identifier, and a merchant identifier;

cataloging, by the payment gateway computing system, the transactional information for each of the plurality of authorization requests into a repository to define historical payment data for a plurality of payment vehicles;

for each of the plurality of authorization request messages, electronically communicating with one or a plurality of payment processors to receive authorization instructions for transmission to a respective requesting merchant of the one or more merchants;

receiving, by the payment gateway computing system over the computer network, a new authorization request message for a cardholder from a point-of-sale system of a particular merchant, wherein the new authorization request message comprises information to identify the cardholder and a payment vehicle associated with the cardholder;

based on the cardholder identified by the new authorization request message, determining, by the payment gateway computing system, whether a predetermined level of historical payment data associated with the cardholder has been cataloged;

generating, by a processor of the payment gateway computing system, an issuer-specific risk score, an issuer-specific risk grade, or an issuer-specific risk ranking for the new authorization request message based on historical transaction data, dispute activity for the payment vehicle, and a plurality of transactions across a plurality of different merchants using a plurality of different payment vehicles, of the cardholder, corresponding to a plurality of different issuers; and transmitting, by the payment gateway computing system over the computer network, the new authorization request message including the issuer-specific risk score, issuer-specific risk grade, or issuer-specific risk ranking to an issuer of the payment vehicle to permit the issuer of the payment vehicle to determine whether to authorize a transaction associated with the new authorization request message.

2. The computer-implemented method of claim 1, wherein the transaction information comprises a requested purchase amount, a date of purchase, and a time of purchase.

3. The computer-implemented method of claim 1 wherein the issuer-specific risk score is correlated to a transaction velocity of the cardholder.

4. The computer-implemented method of claim 3, further comprising:
    determining, by the payment gateway computing system, the transaction velocity of the cardholder based on the historical payment data and the new authorization request message from the point-of-sale system of the particular merchant.

5. The computer-implemented method of claim 1, wherein a format of the issuer-specific risk score, issuer-specific risk grade, or issuer-specific risk ranking is based on the issuer of the payment vehicle.

6. The computer-implemented method of claim 1, wherein the historical payment data comprises transactional information from online gaming transactions.

7. The computer-implemented method of claim 1, wherein the historical payment data comprises transactional information from lottery transactions.

8. The computer-implemented method of claim 1, wherein the issuer-specific risk score, issuer-specific risk grade, or issuer-specific risk ranking is based on a number of different payment vehicles utilized by the cardholder for transactions with betting-related merchants.

9. The computer-implemented method of claim 1, wherein the issuer-specific risk score, issuer-specific risk grade, or issuer-specific risk ranking is further based on whether the cardholder is identified in a third party database that includes a list of problem gamers.

10. The computer-implemented method of claim 1, wherein the new authorization request message carries the issuer-specific risk score, issuer-specific risk grade, or issuer-specific risk ranking within a discretionary field.

11. A payment gateway computing system in communication with a plurality of merchant point-of-sale systems and one or more payment processors, the payment gateway computing system comprising one or more processors and a non-transitory computer-readable medium having instructions stored thereon which when executed by one or more processors cause the one or more processors to:
    receive, over a computer network, a plurality of authorization request messages from one or more point-of-sale systems of one or more merchants, wherein each of the plurality of authorization request messages comprises transactional information including a cardholder identifier, a payment vehicle identifier, and a merchant identifier;
    catalog the transactional information for each of the plurality of authorization requests into a repository to define historical payment data for a plurality of payment vehicles;
    for each of the plurality of authorization request messages, electronically communicate with one or a plurality of payment processors to receive authorization instructions for transmission to a respective requesting merchant or the one or more merchants;
    receive, over the computer network, a new authorization request message for a cardholder from a point-of-sale system of a particular merchant, wherein the new authorization request message comprises information to identify the cardholder and a payment vehicle associated with the cardholder;
    based on the cardholder identified by the new authorization request message, determine, by the payment gateway computing system, whether a predetermined level of historical payment data associated with the cardholder has been cataloged;
    generate, by the processor of the payment gateway computing system, an issuer-specific risk score, an issuer-specific risk grade, or an issuer-specific risk ranking for the new authorization request message based on historical transaction data, dispute activity for the payment vehicle, and a plurality of transactions across a plurality of different merchants using a plurality of different payment vehicles, of the cardholder, corresponding to a plurality of different issuers; and
    transmit, over the computer network, the new authorization request message including the issuer-specific risk score, issuer-specific risk grade, or issuer-specific risk ranking to an issuer of the payment vehicle to permit the issuer of the payment vehicle to determine whether to authorize a transaction associated with the new authorization request message.

12. The payment gateway computing system of claim 11, wherein the transaction information comprises a requested purchase amount, a date of purchase, and a time of purchase.

13. The payment gateway computing system of claim 11, wherein the score is correlated to a transaction velocity of the cardholder.

14. The payment gateway computing system of claim 11, wherein a format of the issuer-specific risk score, issuer-specific risk grade, or issuer-specific risk ranking is based on the issuer of the payment vehicle.

15. The payment gateway computing system of claim 11, wherein the historical payment data comprises transactional information from any of online gaming transactions and lottery transactions.

16. The payment gateway computing system of claim 11, wherein the issuer-specific risk score, issuer-specific risk grade, or issuer-specific risk ranking is based on a number of different payment vehicles utilized by the cardholder for transactions with betting-related merchants.

17. The payment gateway computing system of claim 11, wherein the new authorization request message carries the issuer-specific risk score, issuer-specific risk grade, or issuer-specific risk ranking within a discretionary field.

18. A computer-implemented method of cardholder risk profile generation, comprising:
    receiving, by a payment gateway computing system over a computer network, a plurality of authorization request messages for particular goods or services based on payment transactions initiated by a cardholder, wherein the plurality of authorization request messages originate from two or more different merchants, wherein each of the plurality of authorization request messages comprises transactional information including a cardholder identifier, a payment vehicle identifier, and a merchant identifier;

for each of the plurality of authorization request messages and based on a cardholder identified by the authorization request message, determining, by the payment gateway computing system, whether a predetermined level of historical payment data associated with the cardholder has been stored in a database of historical payment data for a plurality of payment vehicles;

for each of the plurality of authorization request messages and based on the cardholder identified by the authorization request message, generating, by a processor of the payment gateway computing system, an issuer-specific risk score, an issuer-specific risk grade, or an issuer-specific risk ranking for the new authorization request message based on historical transaction data, dispute activity for the payment vehicle, and a plurality of transactions across a plurality of different merchants using a plurality of different payment vehicles, of the cardholder, corresponding to a plurality of different issuers; and for each of the plurality of authorization request messages, electronically communicating over the computer network, by the payment gateway computing system with the issuer of the payment vehicle to permit the issuer of the payment vehicle to determine whether to authorize a transaction associated with the authorization request message, via a payment transaction messaging in a predefined message format to receive authorization instructions, wherein the payment transaction messaging comprises the issuer-specific risk score, issuer-specific risk grade, or issuer-specific risk ranking based on the received plurality of authorization messages, and wherein the issuer-specific risk score, issuer-specific risk grade, or issuer-specific risk ranking is contained within a discretionary field of the predefined message format.

19. The computer-implemented method of claim 18, wherein the issuer-specific risk score is based on an analysis of the plurality of authorization request messages.

20. The computer-implemented method of claim 19, wherein the score is correlated to a transaction velocity of a cardholder.

21. The computer-implemented method of claim 18, wherein the two or more different merchants comprises at least a vendor of lottery tickets and an online gaming merchant.

22. The computer-implemented method of claim 18, wherein the issuer-specific risk score, issuer-specific risk grade, or issuer-specific risk ranking is based at least partially on a number of different payment vehicles utilized by the cardholder for the plurality of authorization request.

* * * * *